Sept. 8, 1936. E. H. BLATTNER 2,053,940
CUSHIONING MECHANISM
Filed Oct. 29, 1930 2 Sheets-Sheet 1
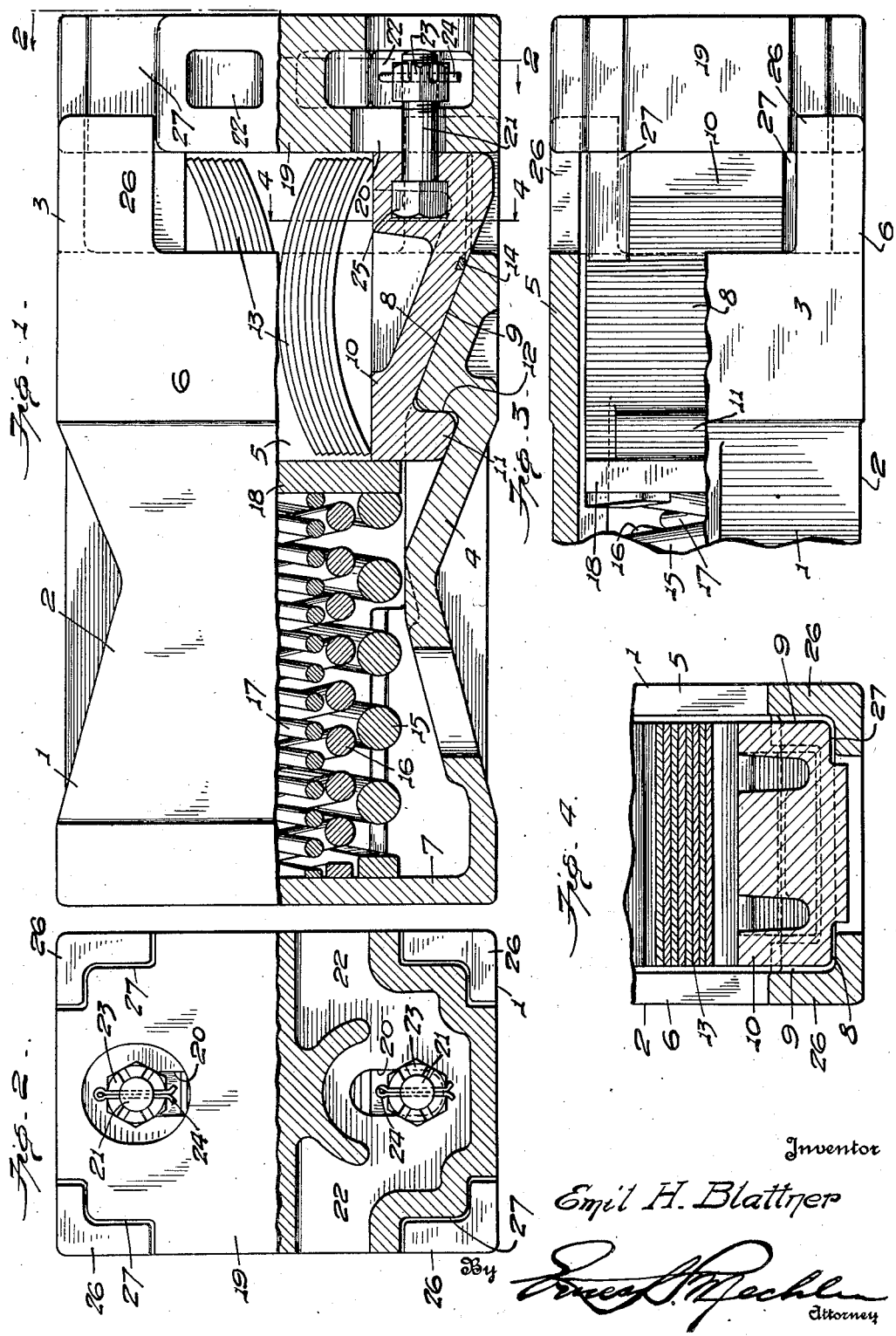

Sept. 8, 1936.  E. H. BLATTNER  2,053,940
CUSHIONING MECHANISM
Filed Oct. 29, 1930  2 Sheets-Sheet 2
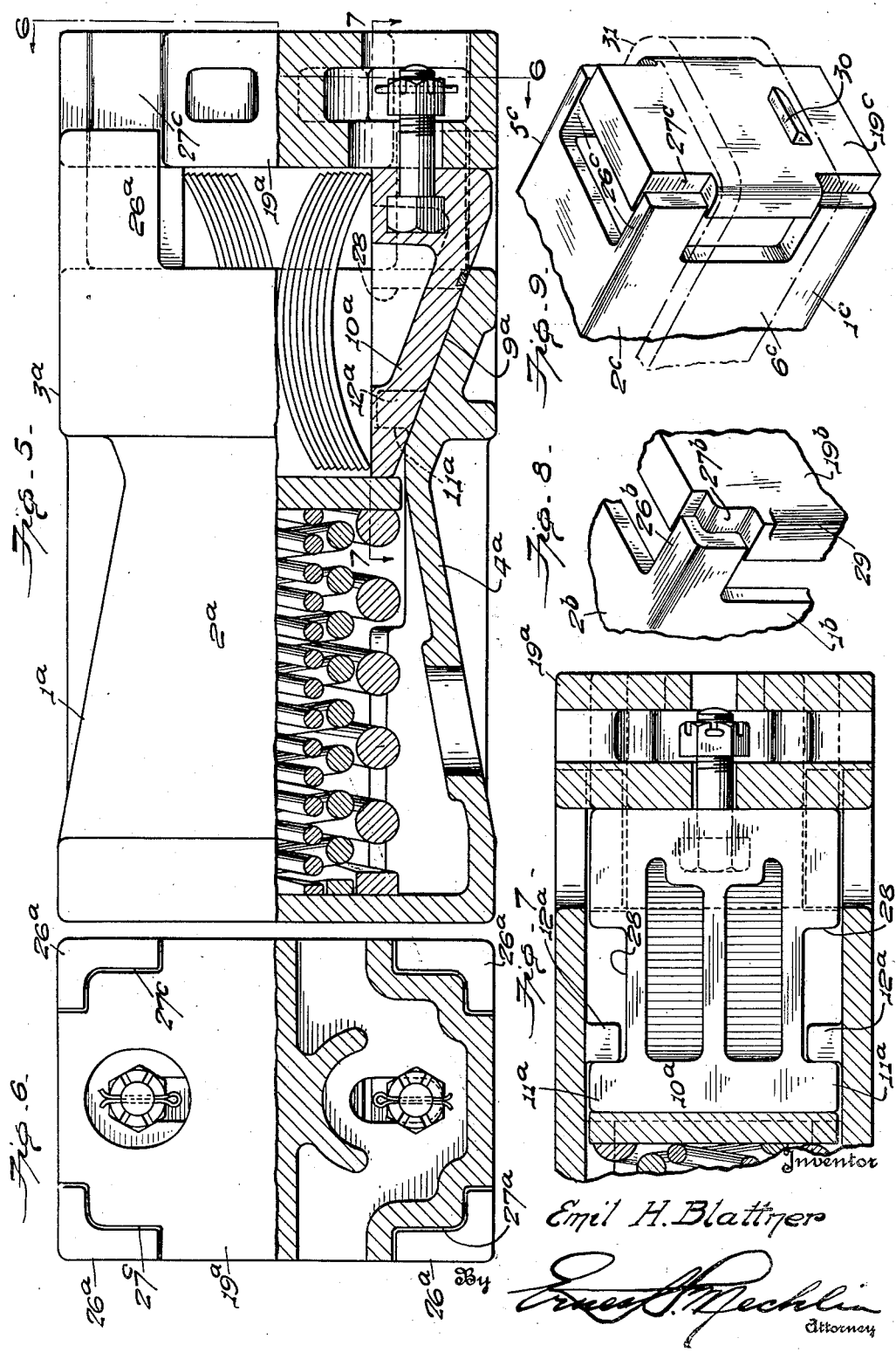
Inventor
Emil H. Blattner
By
Ernest P. Mechlin
Attorney Patented Sept. 8, 1936

2,053,940

UNITED STATES PATENT OFFICE 2,053,940

CUSHIONING MECHANISM

Emil H. Blattner, Rochester, N. Y., assignor to The Gould Coupler Company, New York, N. Y., a corporation of Maryland Application October 29, 1930, Serial No. 492,024

14 Claims. (Cl. 213—30)

This invention relates to cushioning mechanism and, more particularly, to such adapted for use with railway draft rigging.

The principal object of my invention, generally considered, is to provide friction draft gear or cushioning mechanism which is self-contained in that the follower will stay in place with respect to the housing even when the mechanism is removed from the associated rigging or car, said follower for that purpose being desirably interlocked with respect to the housing and/or associated friction elements contained therein, said friction elements, if desired, being interlocked with respect to the housing by lugs extending laterally beyond the friction surfaces thereon, or formed as lateral continuations of said friction surfaces.

Another object of my invention is the provision of cushioning mechanism comprising a housing and associated follower, one of the members having extensions from the corners thereof interlocking in corresponding notches in the other member to hold the parts in longitudinal alignment, while permitting longitudinal movement.

A further object of my invention is the provision of cushioning mechanism involving friction elements and an associated housing in which said elements move, the outer ends of said elements having lugs or studs extending therefrom and receiving nuts on the outer ends thereof, said nuts being, in turn, received in corresponding pockets in the associated follower, said follower having slots permitting lateral movement of the lugs or studs therein, while preventing undesired disconnection of the friction elements with respect to the follower.

A still further object of my invention is the provision of cushioning mechanism comprising a housing open at one end and formed with longitudinally extending walls, one pair of said walls providing inclined friction surfaces, said housing receiving friction elements having correspondingly inclined friction surfaces engaging the friction surfaces thereon, said elements having lugs extending laterally therefrom on either side as continuations of the walls providing the friction surfaces, said housing having shouldered portions adapted to engage said lugs for limiting outward movement of the friction elements.

Other objects and advantages of the invention relating to the particular arrangement and construction of the various parts will become apparent as the description proceeds.

Referring to the drawings illustrating my invention, the scope whereof is defined by the appended claims:—

Figure 1 is a side elevation of a self-contained cushioning mechanism embodying my invention.

Figure 2 is a partial end elevation and partial transverse sectional view on the line 2—2 of Figure 1, looking in the direction of the arrows.

Figure 3 is a partial plan and partial horizontal sectional view of the mechanism looking at the top of the upper friction element or wedge block.

Figure 4 is a fragmentary transverse sectional view on the line 4—4 of Figure 1, looking in the direction of the arrows.

Figure 5 is a view corresponding to Figure 1, but showing a modification.

Figure 6 is a partial end elevation and partial transverse sectional view on the line 6—6 of Figure 5, looking in the direction of the arrows.

Figure 7 is a fragmentary horizontal sectional view on the line 7—7 of Figure 5, looking in the direction of the arrows.

Figure 8 is a fragmentary perspective view showing a modified interlocking arrangement between the housing and associated follower.

Figure 9 is a fragmentary view corresponding to Figure 8, but showing a further modification.

In order to overcome the trouble due to gouging between the outer ends of the friction wedges and the associated follower, I have devised means for restraining the follower from lateral movement with respect to the associated housing, while permitting longitudinal movement in true alignment with said housing. By holding the parts in correct alignment, the draft gear is made to perform more satisfactorily, because the destructive results due to gouging action between the outer ends of the friction wedges and the associated follower are aggravated more and more as the parts get out of correct alignment. I have also provided for holding all the parts of the gear assembled as a unit, even when disconnected from associated draft rigging and removed from the draft gear pocket of an associated railway vehicle.

Referring to the drawings in detail, and first considering the embodiment of my invention illustrated in Figures 1 to 4, inclusive, there is shown a draft gear or cushioning mechanism 1 comprising a cast metal housing 2 formed with longitudinally extending walls 3, 4, 5 and 6. Although I have shown the walls 3 and 4 as upper and lower walls, and the walls 5 and 6 as side walls, it will be understood that my gear, if desired, may be used with the walls 3 and 4 as side walls and the remaining longitudinal walls as upper and lower walls. One end of the housing 2 is preferably closed by a transverse wall 7, the other end being open.

The walls 3 and 4 adjacent the open end of the housing are provided with inclined friction surfaces 8, each of which preferably lies in a single plane, normally engaged by corresponding surfaces 9 on friction elements or wedge blocks 10, said elements having lugs or portions 11 extending laterally beyond the friction surfaces 9 for engaging shouldered portions 12 on the walls 3 and 4 and limiting outward movement of the wedge blocks 10 so as to hold the parts in assembled relation. Resilient means such as curved plate springs 13 are provided for urging the wedge blocks 10 away from each other and into engagement with the inclined friction surfaces on the housing. The inclined friction surfaces 9 and/or the corresponding surfaces 8 may be provided with lead inserts 14, or other means for improving smoothness of operation.

The friction elements or wedge blocks 10 are desirably provided with resilient releasing means which, in the present embodiment, take the form of three helical springs 15, 16 and 17, the inner ends of said springs engaging the inner surface of the end wall 7, and the outer ends engaging the inner surface of the intermediate follower 18, the outer surface of which engages the inner ends of the friction elements or wedge blocks 10 for urging them outwardly into engagement with the shoulders 12 on the housing.

Associated with the housing and friction elements is a follower 19 which, in the present embodiment, is held in assembled relation with respect to the housing 2 by having slots 20 permitting the entrance of connecting means, such as studs or lugs 21, from the outer ends of the wedge blocks 10 to receptacles or pockets 22 outwardly opening to permit the application of nuts 23, the slots 20 being sufficiently narrow to prevent the passage of the applied nuts therethrough, whereby said follower 19 is normally held in assembled relation with respect to the wedge blocks 10, said slots 20 being laterally elongated to permit lateral movement of said blocks, without tending to render the connecting means inoperative upon compression of the gear. The nuts 23 are desirably castellated, and cotters 24 provided to hold them in their locked position on the studs 21, a slight clearance being desirably provided between the adjacent surfaces on the follower and nuts to prevent binding therebetween.

The studs 22 may be connected to the outer ends of the wedge blocks 10 in any desired manner. In the embodiment shown, said studs are provided by casting the wedge blocks around the heads 25 of bolts, the outer ends of which provide the studs or bolt shanks for the purpose described.

In order to hold the follower 19 in axial alignment with the housing 2, interlocking projections are desirably provided between the parts. In the present embodiment, the housing has angular projections or lugs 26 extending from opposite corners, preferably the four corners of the housing, and received in corresponding notches 27 in the follower, so that said follower is guided for longitudinal relative movement with respect to the housing, and provided with portions of reduced section closely embraced between said lugs, as will be understood. The lugs 26 in the embodiment shown extend beyond the friction surfaces 8 on the housing, and the friction blocks 10 are notched, as indicated at 27, to clear the lugs 26, as shown most clearly in Figures 1, 3 and 4.

Referring now to the embodiment of my invention illustrated in Figures 5, 6 and 7, a draft gear or cushioning mechanism 1ª is there disclosed which is substantially identical with the draft gear 1 of the previous embodiment, except that the wedge blocks 10ª have lugs 11ª extending laterally but lying in the same planes as the webs on the wedge blocks carrying the friction surfaces 9ª, in the angle between the planes of said friction surfaces, and outwardly of the longitudinal center line of the mechanism. Said lugs 11ª are normally engaged by corresponding lugs 12ª on the housing, lying longitudinally outwardly of the lugs 11ª and adjacent the inner portions of the housing friction surfaces, said blocks 10ª being cut away, as indicated at 28, to provide the necessary clearance with respect to the lugs 12ª for permitting closure of the gear. The walls 3ª and 4ª of the housing 2ª are correspondingly modified by omitting the shouldered portions, but except for such necessary changes, the construction may be as illustrated and substantially identical with that of the first embodiment, including the connection between the outer ends of the wedge blocks 10ª and the follower 19ª, and the interlocking between the follower and the lugs 26ª on the housing 2ª.

Referring now to the embodiment of my invention illustrated in Figure 8, a housing 2ᵇ for cushioning mechanism 1ᵇ is disclosed only fragmentarily, and provided with longitudinally extending angular lugs 26ᵇ engaging in corresponding notches 27ᵇ in an associated follower 19ᵇ, said follower, in the present instance, however, being plain rather than a hollow cast follower, and not adapted for connection with the outer ends of associated wedge blocks (not shown). Said follower 19ᵇ may be notched at the corners, as indicated at 29, to receive an associated yoke (not shown).

Referring now to the embodiment of my invention illustrated in Figure 9, a construction is there disclosed in which the housing 2ᶜ of the draft gear 1ᶜ, only fragmentarily illustrated, has longitudinally extending lugs 26ᶜ, the lugs, however, extending only from the relatively wide walls 5ᶜ and 6ᶜ, so that they are not angular in section, but rather, merely flat or rectangular in section. The associated follower 19ᶜ is correspondingly notched to receive the interlocking lugs, as indicated at 27ᶜ, said follower, in the present instance, being shown provided with a ledge or lug 30 for supporting an associated yoke 31, diagrammatically illustrated.

From the foregoing disclosure, it will be seen that I have devised an improved draft gear or cushioning mechanism in which the parts of the gear are not only preferably assembled as a unitary device, and held in operative relation even when detached from the associated draft gear and removed from the associated railway vehicle, but the housing and associated follower are so formed that they are held in operative alignment with one another by projections extending from one and interlocking with respect to the other. If desired, the friction elements or wedge blocks may be interlocked with respect to the associated housing by side lugs or stop means, thereby simplifying the wedge construction and permitting an increase in the length of the continuous engaging friction surfaces on the wedge blocks and associated housing.

Although preferred embodiments of my invention have been illustrated, it will be understood that modifications may be made within the spirit and scope of the appended claims.

I claim:—

1. Cushioning mechanism comprising a housing formed with top, bottom and side walls and open at one end, portions of said walls immediately adjacent the corners only being extended to provide lugs involving portions with substantially parallel faces angularly disposed with respect to each other, a follower, with an inner flat face, engaging the open end of said housing, wedges frictionally engaging walls of said housing and said flat face, and means connecting said wedges and follower while allowing the former to slide on the latter, the corresponding corners of said follower being cut away to clear said lugs whereby said housing and follower are held in alignment with one another.

2. Cushioning mechanism adapted for use with railway draft rigging comprising a housing enclosing resilient gear releasing means and friction means, said housing having top, bottom and side walls, those portions of the walls at the four corners thereof being extended locally and longitudinally, a pocketed follower associated with said housing and on which said friction means slides, said follower having the four corners notched to interlock with respect to said lugs and provide portions of reduced width embraced thereby, and connecting means extending from said friction means and slidably received in the pocketed portion of the follower.

3. Cushioning mechanism comprising a housing, a set of friction elements cooperating with said housing, resilient means for urging said friction elements into engagement with said housing, a follower engaging the outer ends of said friction elements, lugs extending from the outer ends of said friction elements, and nuts threadably connected to the outer ends of said lugs for attaching said follower to said friction elements, said follower having pockets receiving said nuts and slots in which said lugs are laterally slidable.

4. Cushioning mechanism comprising a housing provided with an open end adapted to receive resilient means, lugs extending longitudinally from opposite corners of said housing, a follower adapted to engage the open end of said housing and having corresponding corners notched to receive said lugs for holding it in alignment with said housing, a pair of opposite walls of said housing having inwardly converging friction surfaces, friction wedges received in said housing and formed with correspondingly inclined friction surfaces engaging the friction surfaces on said walls, said wedges having laterally extending lugs lying in the planes of their webs carrying the inclined friction surfaces, said housing having lugs lying outwardly of said wedge lugs for limiting outward movement of said wedges, the corresponding sides of said wedges being cut away to provide clearance for said housing lugs for permitting inward movement of said wedges, resilient means disposed between said wedges for urging them into engagement with said housing, and means connecting said wedges to said follower while allowing for lateral movement of the former.

5. Cushioning mechanism comprising an open-ended housing, opposite side walls of said housing adjacent said open end being formed with inclined friction surfaces, a set of friction wedge blocks received in said housing and formed with inclined friction surfaces normally disposed in engagement with the friction surfaces on the housing, said blocks having laterally extending lugs disposed in the planes of their webs that carry the friction surfaces, said housing having cooperating lugs lying outwardly of said wedge block lugs for limiting outward movement of said blocks while permitting inward movement thereof, resilient means disposed between said wedge blocks for urging them into engagement with the friction surfaces on said housing, a follower engaging the outer ends of said wedge blocks, connecting means extending from said wedge blocks with their outer ends received in said follower, and nuts threadably mounted on said connecting means for attaching said follower thereto, said follower having pockets receiving said nuts and slots receiving said connecting means for permitting lateral movement of the wedge blocks with respect thereto.

6. Cushioning mechanism comprising a housing, friction elements cooperating with said housing, resilient means urging said friction elements into engagement with said housing, a follower associated with said friction elements, lugs extending between said follower and the adjacent ends of said friction elements, and means disposed on said lugs adjacent the free ends thereof for holding said follower and friction elements assembled, the parts receiving the free ends of said lugs being pocketed to receive said means, said lugs extending through slots opening into said pockets and laterally slidable therein.

7. Cushioning mechanism comprising an open-ended housing, opposite side walls of said housing adjacent said open end providing inclined friction surfaces, a set of friction elements received in said housing and cooperating with said friction surfaces, resilient means disposed between said friction elements for urging them into engagement with said friction surfaces, a follower slidably engaged by the outer ends of said friction elements, and connecting lugs extending longitudinally from said mechanism with their outer ends slidably received in said follower for limiting relative longitudinal movement thereof with respect to said friction elements, said follower having receptacles for said lugs.

8. Cushioning mechanism comprising a housing, lugs extending longitudinally from opposite corners of said housing, a follower adapted to engage the open end of said housing and having the corresponding corners notched to receive said lugs in embracing relationship therewith for holding it in alignment with said housing, a set of friction elements enclosed in said housing, resilient means for urging said elements into engagement with said housing, said follower engaging the outer ends of said friction elements, lugs extending between the outer ends of said friction elements and said follower, and means connected to the free ends of said friction element lugs for attaching said follower to said friction elements, said parts receiving the free ends of said lugs having pockets receiving said means and slots in which said lugs are laterally slidable.

9. Cushioning mechanism comprising a housing formed with top, bottom and side walls and open at one end, portions of said walls being locally extended at junctions thereof to provide lugs angular in section, a follower engaging the open end of said housing and having its corresponding corners correspondingly cut away to clear said lugs so that they hold said follower in alignment with the housing, a set of friction elements received in said housing, resilient means for urging said friction elements into engagement with walls of said housing, said follower engaging the outer ends of said friction elements, lugs each extending between one of said friction elements and said follower, and each with a free end received in one of said members and the other end rigid with another member, and means connected to the free ends of said lugs for effecting the connection of said follower to said friction elements, the member receiving a free end of a lug having a pocket receiving said means and a slot for permitting lateral movement between said lugs and the pocketed member.

10. Cushioning mechanism comprising a housing, friction elements cooperating with said housing, resilient means urging said elements into engagement with said housing, a follower associated with said friction elements, and connecting means extending between said follower and the adjacent ends of said friction elements for holding said follower and friction elements assembled, the parts receiving the free ends of said connecting means being pocketed to receive the same, while allowing lateral sliding therebetween without tending to render the connecting means inoperative.

11. Cushioning mechanism comprising a housing, friction means cooperating with said housing, resilient means for urging said friction means into engagement with said housing, follower means engaging the outer portion of said friction means, lug means extending from the outer end of said friction means, and means connected to said lug means for attaching said follower means to said friction means, said follower means being pocketed to receive said connected means and slotted to allow lateral sliding of said lug means.

12. Cushioning mechanism comprising a housing, friction elements cooperating with said housing, resilient means for urging said friction elements into engagement with said housing, said friction elements having webs carrying friction surfaces and lugs lying in the planes of said webs, said housing having shoulders for engaging said lugs to limit outward movement of said elements, a follower associated with said friction elements, other lugs extending between said follower and the adjacent ends of said friction elements, and means disposed on said lugs adjacent the free ends thereof for holding said follower and friction elements assembled, the parts receiving the free ends of said lugs being pocketed to receive said means, said lugs extending through slots opening into said pockets and laterally slidable therein.

13. Cushioning mechanism comprising a housing having top, bottom and side walls, an oppositely disposed pair of said walls being formed with inwardly converging friction surfaces, each of which lies in a single plane, friction wedges received in said housing and provided with correspondingly inclined friction surfaces engaging said friction surfaces on said walls, said wedges having their sides notched, reducing the width and leaving laterally extending lugs adjacent their inner ends, said housing having lugs disposed between the planes of said friction surfaces, engaging in said notched portions outwardly of said lugs on said wedges and longitudinally in line therewith, adjacent the inner portions of said housing friction surfaces, for limiting outward movement of said wedges, and curved plate springs disposed between said wedges for pushing them outwardly into engagement with said housing friction surfaces, the inner ends of said springs engaging the inner portions of said wedges and of a width corresponding with the wedge width including the lateral lugs, so that the inner ends of said springs rest on the inner end portions of said wedges and wedge lugs as abutments and bridge the notched portions thereof with their outer ends engaging the outer end portions of said wedges beyond the notches therein, said notches being sufficiently long to provide the clearance, with respect to said housing lugs, necessary for the desired relative movement between said wedges and housing.

14. Cushioning mechanism comprising a housing formed with top, bottom and side walls and open at one end, portions of said walls being locally extended to provide lugs, a follower disposed at the open end of said housing and having its corresponding portions notched to slidably receive said lugs so that they hold said follower in alignment with said housing, a set of friction elements received in said housing, resilient means for urging said friction elements into engagement with walls of said housing, said follower engaging the outer ends of said friction elements, and projections each extending between one of said friction elements and said follower, and each with a free end received in one of said members, and the other end rigid with another member, and means connected to the free ends of said projections for effecting the connection of said follower to said friction elements, the member receiving a free end of a projection having a pocket receiving said means and slotted to permit lateral movement of said projection therein, whereby the housing, friction elements and follower are maintained assembled and held in alignment without interfering with the functioning of the mechanism.

EMIL H. BLATTNER.